(No Model.)
A. M. SCHUTZ.
BICYCLE BRAKE AND ALARM.
No. 597,863. Patented Jan. 25, 1898.
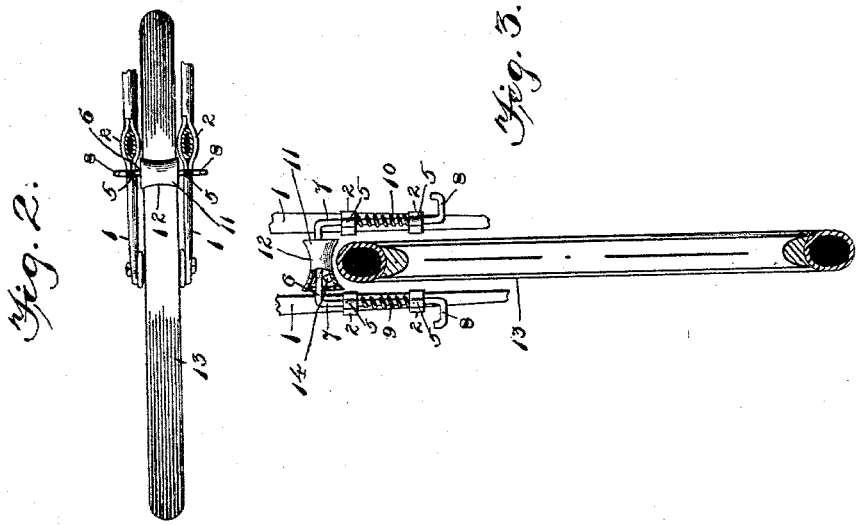
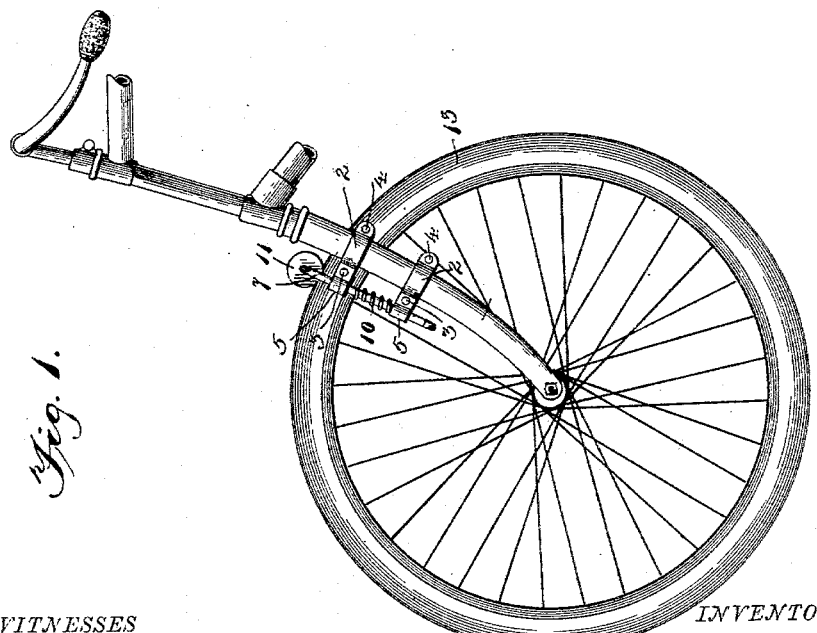
WITNESSES
T. L. Mockabee
George A. Byrne
INVENTOR,
August M. Schutz.
by John Wedderburn
Attorney

UNITED STATES PATENT OFFICE.

AUGUST M. SCHUTZ, OF JERSEY CITY, NEW JERSEY.

BICYCLE BRAKE AND ALARM.

SPECIFICATION forming part of Letters Patent No. 597,863, dated January 25, 1898.

Application filed November 10, 1896. Serial No. 611,673. (No model.)

*To all whom it may concern:*

Be it known that I, AUGUST M. SCHUTZ, a citizen of the United States, residing at Jersey City, in the county of Hudson and State of New Jersey, have invented certain new and useful Improvements in Vehicle-Brakes; and I do hereby declare the following to be a full, clear, and exact description of the invention, such as will enable others skilled in the art to which it appertains to make and use the same.

My invention relates to vehicle-brakes.

My object is to provide a vehicle-brake of extremely cheap and simple construction which will be particularly adapted for use on bicycles and can be readily applied to or removed from same, and which may be quickly and easily manipulated by the feet of the rider, and one which will exert a powerful braking force when applied, but will in no manner injure the tire.

A further object is to provide a novel form of bicycle-brake which when applied to the wheel of the bicycle will be adapted to automatically sound an alarm, thereby obviating the necessity of employing a bell.

The invention consists of a combined bicycle brake and bell comprising certain improved features and novel combinations of parts appearing more fully hereinafter.

In the accompanying drawings, Figure 1 is a side elevation of a bicycle, showing my improved brake applied thereto; Fig. 2, a top view, and Fig. 3 a view in cross-section with a portion of the braking-wheel broken away to disclose the movable body inside.

The numeral 1 designates the front fork of the bicycle-frame. I employ four clips or shackles 2, two being located on each member of the fork. Each clip is made of one piece, which is bent to form duplicate parts connected together at their ends by the removable bolts or screws 3 and 4. Each portion of the clip is provided with a semicircular part 5, so that when the clip is in position the two semicircular parts come together and unite to form a circular guide. The lower clips are located slightly above the point where the coasters would be applied to the fork.

There is a substantially U-shaped frame, which is made up of a cross-piece 6, legs 7, which are slidable in the guides, and outwardly-bent feet 8. These feet are adapted to be pressed upon by the feet of the rider when applied to the brake.

The numerals 9 and 10 represent two coil-springs, which encircle the legs 7 and bear on the lower clip. The upper ends of said springs are securely connected to the legs, and hence these springs serve to keep the frame normally raised.

At 11 I have shown the improved form of braking-wheel employed. This wheel is preferably constructed of metal of resonant property, it being in the form of a roller provided with the annular concavity 12, adapted to fit the tire 13 of the bicycle-wheel. Said wheel 11 is journaled on the cross-piece 6 of the frame. Inside of the wheel there is located a body 14, preferably of irregular shape and which is free to tumble about inside, and, by striking on the braking-wheel, send forth sound. It is obvious that this body could be dispensed with and a wooden or rubber roller employed in place of the metal, or, if desirable, a brake pad or shoe could be substituted for the roller or wheel. When it is desirable to use the brake, the feet of the frame are depressed, thereby bringing the braking-wheel into contact with the tire of the bicycle-wheel, whereupon the braking-wheel will revolve, but at the same time exert a retarding force, so that the bicycle can be quickly and easily stopped or brought under control. When the wheel revolves, the body 14 is tossed about, and as it strikes the wheel it sends forth notes or sounds, and hence the necessity of employing a bell on the bicycle is obviated, for whenever it is desirable to sound an alarm the rider can simply bring the braking-wheel into light contact with the bicycle-wheel.

Although in the presence instance I have shown and described my brake as applied to a bicycle, yet of course it is applicable to any vehicle.

Having thus described my invention, what I claim as new, and desire to secure by Letters Patent, is—

The herein-described combined bicycle brake and bell comprising double clips secured to the members of the front fork of the bicycle, a substantially U-shaped inverted frame having the ends of its legs extending outwardly to serve as rests for the feet of the rider and its legs slidable through the outer portions of the double clips, a concaved hollow roller of resonant material journaled on the cross-piece of the said frame and adapted to bear against the bicycle-tire, a body located inside the said roller and adapted to freely toss about therein when the same is in rotation, and coil-springs encircling the legs and bearing on the clips and having their upper ends secured to the legs whereby the frame is normally kept level and the roller out of contact with the bicycle-tire.

In testimony whereof I have signed this specification in the presence of two subscribing witnesses.

AUGUST M. SCHUTZ.

Witnesses:
 GEO. JOHNSON,
 JOSEPH MCCOMB.